(12) United States Patent
Meyer et al.

(10) Patent No.: US 12,141,617 B2
(45) Date of Patent: *Nov. 12, 2024

(54) SYSTEM AND METHOD OF IDENTIFYING EQUIVALENTS FOR TASK COMPLETION

(71) Applicant: Grass Valley Canada, Montreal (CA)

(72) Inventors: Charles S. Meyer, Montreal (CA); James Westland Cain, Montreal (CA)

(73) Assignee: GRASS VALLEY CANADA, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/399,912

(22) Filed: Aug. 11, 2021

(65) Prior Publication Data

US 2021/0373962 A1    Dec. 2, 2021

Related U.S. Application Data

(63) Continuation of application No. 16/837,411, filed on Apr. 1, 2020, now Pat. No. 11,138,042.

(60) Provisional application No. 62/830,198, filed on Apr. 5, 2019.

(51) Int. Cl.
    *G06F 9/50*    (2006.01)
(52) U.S. Cl.
    CPC .................. *G06F 9/5044* (2013.01)
(58) Field of Classification Search
    CPC ..................................................... G06F 9/5044
    See application file for complete search history.

(56) References Cited

U.S. PATENT DOCUMENTS

| | | |
|---|---|---|
| 6,978,422 B1 | 12/2005 | Bushe et al. |
| 7,272,615 B2 | 9/2007 | Li et al. |
| 7,533,173 B2 | 5/2009 | Badovinatz |
| 8,751,420 B2 | 6/2014 | Hjelm |
| 9,032,077 B1 | 5/2015 | Klein |

(Continued)

FOREIGN PATENT DOCUMENTS

| | | |
|---|---|---|
| CN | 104123184 A | 10/2014 |
| CN | 106600746 A | 4/2017 |
| EP | 1764761 A1 | 3/2007 |

OTHER PUBLICATIONS

International Search Report and Written Opinion for PCT/CA2020/050453, mailed on Jun. 18, 2020, 9 pages.

(Continued)

*Primary Examiner* — Sisley N Kim
(74) *Attorney, Agent, or Firm* — ARENTFOX SCHIFF LLP

(57) ABSTRACT

A system is provided for determining equivalence to execute a task. The system includes an identity module that obtains a unique identity for each of a plurality of resources, and a metadata collection module that collects metadata information relating to the plurality of resources based on the obtained unique identifier for each resource, and that stores the collected metadata information in a metadata database, with the metadata information relating to capabilities of the respective resource for executing the task. Moreover, the system includes an equivalence processor that determines a set of resources of the plurality of resources that are configured to execute the task defined by a requesting client device in an equivalent manner based on the collected metadata information of the at least one set of resources.

18 Claims, 5 Drawing Sheets

(56) References Cited

U.S. PATENT DOCUMENTS

| | | |
|---|---|---|
| 9,531,607 B1 | 12/2016 | Pai |
| 11,029,999 B1* | 6/2021 | Ackley .................. H04L 67/10 |
| 11,487,585 B1* | 11/2022 | Gilliland ............... G06F 9/5044 |
| 2010/0077162 A1 | 3/2010 | Kaneko |
| 2013/0219068 A1 | 8/2013 | Ballani et al. |
| 2017/0153965 A1 | 6/2017 | Nitta |
| 2019/0044703 A1 | 2/2019 | Smith |
| 2019/0220379 A1* | 7/2019 | Li ......................... G06F 3/0631 |

OTHER PUBLICATIONS

Extended European Search Report issued on Mar. 31, 2022 in connection with related European Patent Application No. 20782623.1.

Communication pursuant to Article 94(3) EPC issued in EP Application No. 20782623.1, dated Jan. 9, 2024, 5 pages.

Notification of the First Office Action issued in Chinese Patent Application No. 202080041284.2, issued Sep. 7, 2024, 17 pages.

* cited by examiner

SYSTEM AND METHOD OF IDENTIFYING EQUIVALENTS FOR TASK COMPLETION

CROSS REFERENCE TO RELATED APPLICATIONS

The present application is a continuation of U.S. patent application Ser. No. 16/837,411, filed Apr. 1, 2020, which claims priority to U.S. Patent Provisional Application No. 62/830,198, filed Apr. 5, 2019, the contents of which are hereby incorporated in their entirety.

TECHNICAL FIELD

The present disclosure generally relates to resource allocation and task completion, and, more particularly, to a system and method of identifying equivalents for task completion.

BACKGROUND

Typically, Enterprise Resource Planning (ERP) or Material Requirement Planning (MRP) systems can be closely integrated with customer facing aspects of the company, such as sales tools. ERP/MRP systems work most effectively when based on principles of immutable identity, whereas sales tools do not exploit this aspect well. It is still a challenge to show how identity can be used to achieve the goal of integrating a traditional factory into an Internet-of-Things (IoT) optimization model.

Developer Operations and the Internet in general exploit the concept of identity. An example is a modern software factory that targets products deployed in the cloud and leverages the cloud and other Internet technologies to generate dynamic, soft factories. The modern software factory can be closely coupled to the commercial business systems of the company. This complete system: Develop, Sell, Deploy can then be monitored at every step, including customer usage. It now becomes an IoT, capable of dynamic optimization by a provider, client or customer.

However, there is currently a tendency in the market to enforce strict operating points that are narrow and vertical. The term operating points has been adopted to provide a guide for how to configure a system based on an identified set of standards and specifications, sub-sections they include, and specific compliance for options in these sub-sections. Plant optimization is now narrowed due to limits imposed at each level of the Open Systems Interconnected (OSI) stack, as one example, and potentially cloud stacks, for another example. The Joint Task Force on Network Media proposed such a stack and published it as part of the JT-NM RA 1.0 stack. Recently, the same organization developed a specification, TR-1001-1 which narrows the options in this stack, providing a single operating point. This eliminates significant factory flexibility required to meet the very changing needs of modern technology. By narrowing choice, the flexibility, and power of abstraction are lost. There exists, therefore, a need to protect abstraction while maintaining predictability.

Traditionally, interchangeability, or interoperability required, or implies identical entities. As Internet technology permeates nearly every process of our existence, it is interesting to consider that everything, or most anything, can be modeled as a factory, or a control system, where the factory is dynamically optimized in real-time to improve its' desired output.

Many factories can be composed of software itself, others can provide telemetry for physical equipment at every stage of the process. Many physical factory appliances are themselves programmable, for different applications, just as the cloud is programmable, to provide myriad functions suiting an even larger collections of applications. Two such examples could be on premise compute and FGPA based cards used as equivalent calculation, or processing devices.

In short, it is fair to model all factories, virtual or tangible as a collection of process which can be configured, controlled and monitored.

In another aspect of consideration, the value of strong identity is used today in the cloud to ensure uniqueness and therefore the identical nature of a thing. Manufacturing processes have focused on quality for decades. The goal is to enable and encourage factory auditability and traceability such that processes are improved to hit target metrics, such as 6-sigma. In order to ensure this result, each aspect of a "product" is documented and provided a unique part number or a unique identifier. In a physical factory, such as used for PCBs, a Pick and Place machine is programmed based on the PCB assembly being manufactured. This program can be assigned an identity. The design rules for the PCB, solder pad sizes, or impedance control PCB stack criteria, can also be assigned identity. In similar fashion, other aspects, such as a warehouse, the components in a warehouse, the standard cost, the value added, all can be assigned identity. This provides traceability and auditability.

In the cloud, infrastructure as code (IAC) and configuration as code (CAC) provide for a very dynamic factory that is effectively a software defined processing capability which enables software execution of the desired task at hand. In this case, code modules may be assigned identity, compilers for the code are assigned identity, the IAC and CAC are assigned identity, and the like. Now, a Cloud process is equally auditable and traceable.

However, a problem exists in how to use this identity to provide flexible, parametric approach to software factory services.

SUMMARY

Thus, according to an exemplary aspect, systems and methods are disclosed that are configured to identify equivalents for task completion.

In general, the system comprises a database comprising metadata information associated with a plurality of resources, the resources comprising physical and soft resources; and a processor, configured to execute: an equivalence module comprising: a metadata collection module configured to collect metadata regarding the plurality of resources and storing the metadata as metadata information in the database, an identity module configured to establish an identity for each resource and its equivalences, a transmission module configured to receive, from a client, a requirement for a particular output, wherein the equivalence module is configured to: determine a set of resources that complete the requirement in an equivalent manner based on the collected metadata and identity of resources and provide the resources to the requesting client.

In another aspect of the system, the metadata for the resources enumerate their capabilities and their capacity for each capability. Different subsets of this metadata, including all the metadata, provide a measure of equivalence, which is assigned a unique identity.

In another exemplary aspect, a system is provided for determining equivalence to execute a task. In this aspect, the system includes a metadata database comprising metadata information associated with a plurality of resources that include both physical resources and soft resources; an equivalence processor configured to execute: an identity module configured to obtain a unique identity for each of the plurality of resources; a metadata collection module configured to collect metadata information relating to the plurality of resources based on the obtained unique identifier for each resource, and to store the collected metadata information in the metadata database, with the metadata information relating to capabilities of the respective resource for performing a process for executing the task, wherein the capabilities for performing the process relate to required time, efficiency, physical capabilities and technological capabilities of the respective resource to perform the process. In the exemplary aspect, the equivalence processor is configured to determine at least one set of resources of the plurality of resources that are configured to complete a requirement received from a requesting client device in an equivalent manner based on the collected metadata information of the at least one set of resources. Moreover, the equivalence processor is configured is configured to provide access of the determined at least one set of resources to the requesting client device to coordinate execution of the respective process by each of the one set of resources to execute the task.

In another exemplary embodiment, a system is provided for determining equivalence to execute a task. In this aspect, the system includes an identity module configured to obtain a unique identity for each of a plurality of resources; a metadata collection module configured to collect metadata information relating to the plurality of resources based on the obtained unique identifier for each resource, and to store the collected metadata information in a metadata database, with the metadata information relating to capabilities of the respective resource for executing the task; and an equivalence processor is configured to determine at least one set of resources of the plurality of resources that are configured to execute the task defined by a requesting client device in an equivalent manner based on the collected metadata information of the at least one set of resources. Moreover, the equivalence processor is configured is configured to provide access of the determined at least one set of resources to the requesting client device to coordinate execution of the task by at least a portion of the one set of resources to execute the task.

In another exemplary aspect, the plurality of resources include both physical resources and soft resources.

In another exemplary aspect, the capabilities for performing processes of the task relate to required time, efficiency, physical capabilities and technological capabilities of the respective resource to perform the respective process, In another exemplary aspect, the metadata information for the plurality of resources enumerate the respective capabilities and a respective capacity for each capability.

In another exemplary aspect, different subsets of the metadata information provide a measure of equivalence, and each subset is assigned a unique identity.

In another exemplary aspect, the equivalence processor is configured to determine the at least one set of resources for completing requirements of the task in the equivalent manner by selecting the at least one set of resources that comprises the capabilities for performing respective processes for executing the task when other resources of the plurality of resources with equivalent capabilities are not available for completing the task.

In another exemplary aspect, the requesting client device is configured to provide a user interface configured to define the task and the client device is configured to automatically build requirements for completing the task. Moreover, the user interface provided by the client device is configured to display a list of the at least one set of resources, such that the user can select the portion of the at least one set of resources to coordinate the execution of the task.

In another exemplary aspect, the metadata collection module configured to dynamically update the metadata information in the metadata database as availability and capability of each resource of the plurality of resources changes.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

DETAILED DESCRIPTION

Figure 1:
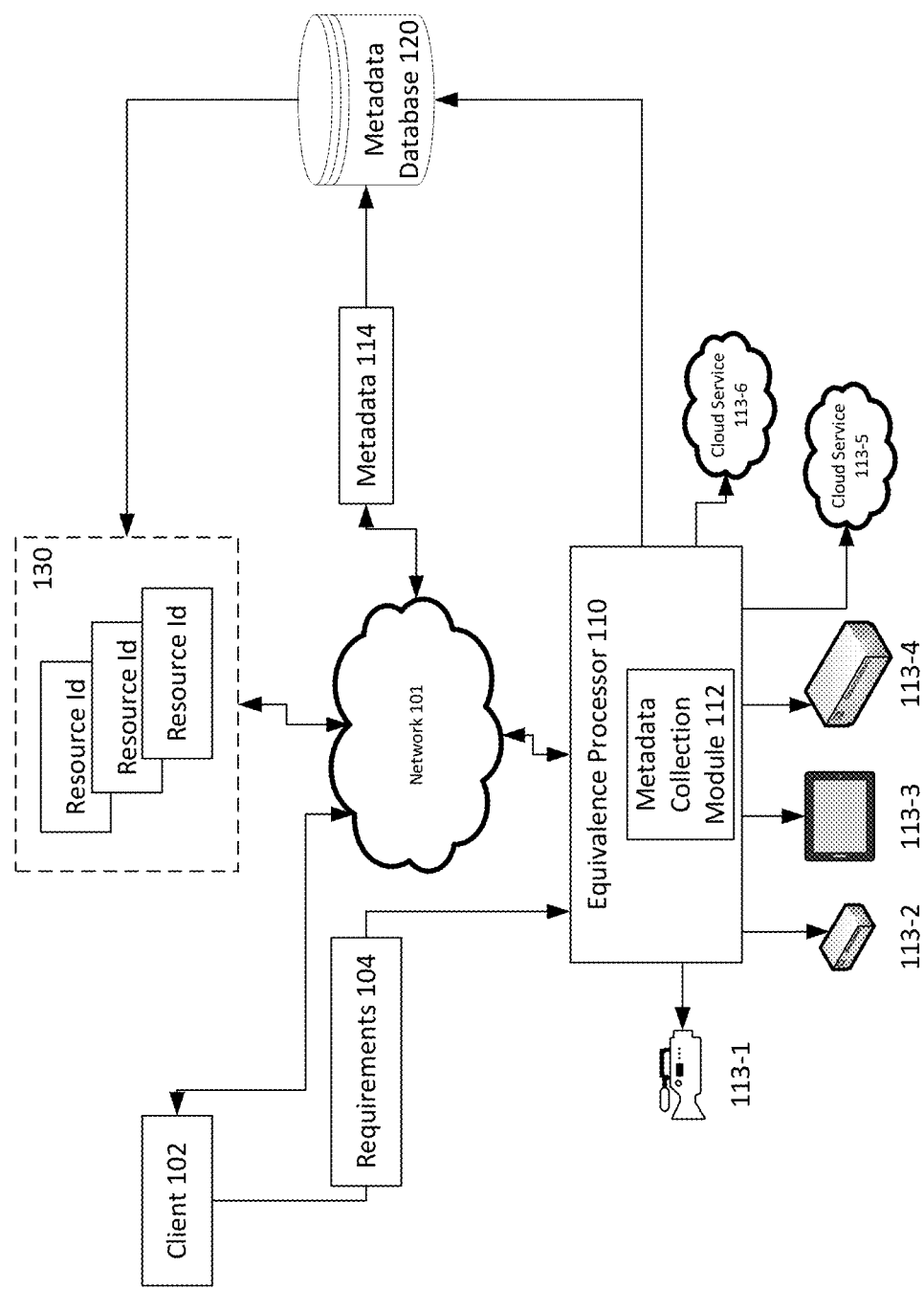
FIG. 1 is a block diagram of a system of identifying equivalents for task completion, in accordance with exemplary aspects of the present disclosure.

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

FIG. 1 illustrates a system 100 of identifying equivalents for task completion, in accordance with an exemplary embodiment.

The system 100 comprises a client 102 (e.g., a computer or similar computing device), an equivalence processor 110, and a metadata database 120. In some embodiments, the client 102 requests a set of resources from the database 120 over network 101 to accomplish a particular task, characterized by requirements 104. In general, network 101 can be any network for communicating data and data operations and can include a communication system (not shown) that connects the various computers of the system by wire, cable, fiber optic, and/or wireless links facilitated by various types of well-known network elements, such as hubs, switches, routers, and the like. Network 101 may employ various well-known protocols to communicate information amongst the network resources. In one aspect, the network 101 can be part of the Internet or intranet using various communications infrastructure such as Ethernet, Wi-Fi and the like.

According to an exemplary aspect, the requested set of resources (e.g., requirement 104) can be a set of hardware or physical resources to equip a factory to produce a certain product. In another example, the requirements 104 may ask for completion of a task such as camera "look" matching, cloud service allocations or the like. An example of techniques for coordinating camera "look" matching is described in U.S. application Ser. No. 16/832,468, entitled "System and Method of Partial Matching of Control Settings Across Camera", filed Mar. 27, 2020, the contents of which are hereby incorporated by reference.

According to the exemplary embodiment, the equivalence processor 110 is configured to query the metadata database 120 to determine what resources may accomplish the particular task according to the requirements 104 to provide the client 102 with guidelines or even a blueprint for complete resource allocation. Resource identifiers are returned from the metadata database 120 to the client 102 via network 101 by the equivalence processor 110 so the client 102 can assemble a workflow and/or choose one or more of the resources to complete the desired task for satisfying requirements 104. In exemplary aspects, the resource identifiers may include descriptions of the type of resource, a make of the resource, capabilities of the resource, usage parameters for the resource, and other linked resources. In exemplary aspects, the resource type maybe physical (e.g., a computing device, mobile device, microchip, or other internet connected device, or the like), software based (e.g., a software application, a software service, a cloud computing platform, or the like), or the like. The capabilities of the resource may indicate how a client 102 may best use the resource in order to achieve an equivalence to a desired result, while attempting to meet the requirements 104. Furthermore, the resource may be associated with one or more linked resources, whether of the same or of a different type, that may optionally be invoked by the returned resource.

According to an exemplary aspect, the equivalence processor 110 may also comprise a metadata collection module 112. In general, the term "module" as used herein can refer to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

According to the exemplary embodiment, the metadata collection module 112 is configured collect metadata information from a plurality of resources. An illustrative set of resources 113-1 to 113-6 are shown in FIG. 1, of which each resource 113-1 to 113-6 can be a device (either tangible or virtual) that has a resource ID 130, that is associated with a respective resources 113-1 to 113-6 and which has a unique relationship to its respective metadata. The resource IDs 130 can be stored remotely in a cloud computing environment (e.g., as shown by dashed lines of 130) or directly stored by the resources 113-1 to 113-6 themselves, for example. In either case, the device IDs 130 are associated with the metadata for each respective resources 113-1 to 113-6.

According to the exemplary embodiment, the metadata collection module 112 is configured to dynamically collect or receive metadata information of various and many other devices. For example, the metadata collection module 112 can be configured to query a list of available resources (e.g., resources 113-1 to 113-6) in which each resource is being linked to and shares its unique identity. In one aspect, the unique identity can be an attribute filed in its metadata record. In another exemplary aspect, the unique identity for a resource can be composed of a number of logically group identities. An example of a methodology for accessing media assets, as a type of resource, is described in U.S. application Ser. No. 16/569,323, entitled "System and Method for Dynamically Accessing Media Assets, filed Sep. 12, 2019, the contents of which are hereby incorporated by reference.

In another exemplary aspect, a list of resource locators is provided to the metadata collection module 112, and the module 112 is configured to communicate with the resources to receive metadata records that are associated with the unique resource ID for that resource. Alternatively, in some aspects, a resource may be smart, connected to the Internet (for example in a cloud environment as shown in reference 130), and may submit metadata information to listening servers, submitted to the metadata collection module 112. The collected metadata 114 is stored in metadata database 120. Once a request to find resource equivalents for the client 102 based on requirements 104, the equivalence processor 110 is configured to retrieve resource IDs 130 and return them to the client device 102 via network 101, for example. In some aspects, the client 102, the equivalence processor 110, the metadata database 120 or any other components may be located locally, remotely, or any combination thereof.

In an exemplary aspect of the present disclosure, the equivalence processor 110 can be configured to establish a unique identify for each of the resources whose metadata is collected, the identity establishing the capabilities and capacity of the given resource. In one example, the unique identity for IoT or other connected devices can be assigned by a process, similar to DHCP (dynamic host configuration protocol). For example, a physical device could provide its MAC address, or, alternatively, a virtual device could provide a unique address based upon the port MAC and the served IP address. The AMWA IS-05 specification uses LLDP as a way to initiate a connection, and create a unique ID for a virtual resource. It should be appreciated that there is no loss of generality with such method when considering transient devices: one which are spun up, and then later spun down.

In general, although the identity of each resource is unique, there may be other resources with "equivalent" capabilities and capacities. With a unique identity, "equivalence" refers to a set of outcomes that can replace the desired outcome, based on the requirements 105, or in other words provide an outcome as good as the desired outcome (e.g., within a threshold of a desired outcome). For example, a resource A may be as a good as resource B because for a given application, with the result being identical enough for purposes of satisfying the requested task. In exemplary aspects, this is a fuzzy determination and can be based on a number of algorithms to determine whether a set of resources can produce an outcome "close enough" to the desired outcome, with a predetermined threshold similarity.

For example, in the cloud, the equivalence processor may recruit a CPU, or a GPU (G1, referring to a GPU instance in the cloud) or a field programmable gate array (FPGA) (F1, referring to an FPGA instance in the cloud) for a given client 102 to perform a given operation or process. The results for each may be slightly different. For example, different quantization errors may occur based on available arithmetic options in each of the CPU, GPU or FPGA. Another difference could be that compute time could vary significantly, but if the process can wait, the solution might cost less to calculate. In a third difference, the "cloud" might actually reside on premise as a collection of compute nodes, rather than in the cloud. This might be done for reasons of transmission bandwidth, security or both.

However, each of these resources are considered to have equivalence, and each may be described by a capability (e.g., bandwidth, latency, FLOPs) and a capacity (e.g., 10 Gbps, 5 msec, 1 TeraFlop). In fact, each capacity could be a range, rather than a single point in one aspect. Capabilities could be a formula, or re-direction to a formula, or useful mathematical representation. A gamma curve might be called out explicitly, as could a color space. The range of capabilities (or capacity for capabilities) could be the arithmetic precision, processing time, or the like. A complex function might need additional parameterization, in which case the function is redirected to other software or hardware components. This allows the client 102 to adjust certain parameters of that function as needed for their use case. The function has an identity and acts as a resource as well. The type of settings, capabilities, and ranges for these settings, capacity, are now distinct and reusable.

In the end, this additional data is one form of metadata. The metadata can be delivered in header extensions, for example, and/or it can be used within files and it can be stored in the metadata database 130.

By specification, any "device" or "physical machine" may act as a resource 113-1 to 113-6 and may expose key criteria, metadata, for "equivalence" and using this information, an equivalent substitution can be made automatically. Optimization of any factory may occur based on business criteria going beyond traditional materials cost, fixed factory cost and fixed factory utilization.

Generic optimization is complex. If order independent, the space is factorial. If it is order dependent it is combinatorial. If it is order dependent and bounded, by the equivalence metadata, for example, the optimization complexity is significantly reduced. In some customer use cases, certain dependencies can be eliminated altogether, further decreasing the N space of solutions. In many cases, elastic search may then be preferred over optimization.

The measure of "as good as" is based on the application, in exemplary aspects of the disclosure. The published metadata for a resource is interpreted to determine whether the resource can produce an outcome that is "as good as" a desired outcome. One easy way to choose a resource, in some examples, is to search for resources meeting one or more specified parameter ranges.

Figure 2:
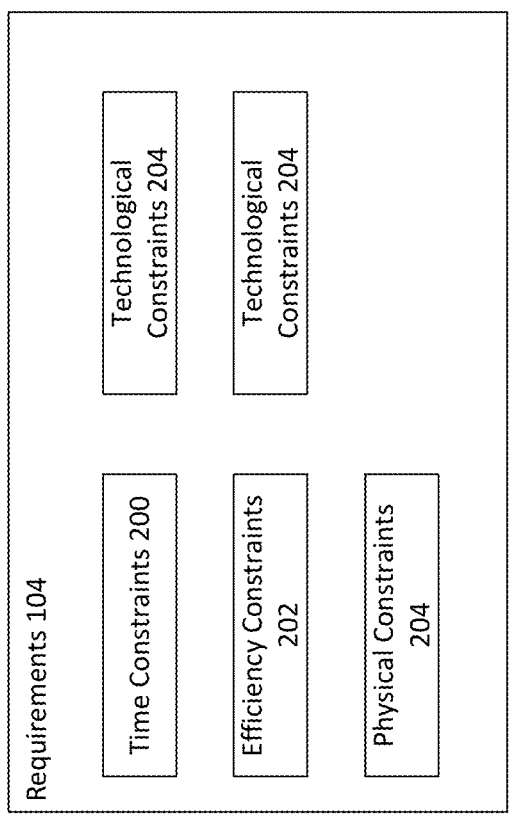
FIG. 2 is a block diagram illustrating an exemplary requirement, according to exemplary aspects of the disclosure.

FIG. 2 is a block diagram illustrating an exemplary requirement 104 according to an exemplary aspect of the disclosure. As described above, the requirements 104 defined by client device 102 can be set based on a requested task and/or workflow set by client device 102. More particularly, the requirements 104 can be a set of hardware or physical resources to equip a factory to produce a certain product or the requirements 104 can ask for completion of the task, such as camera "look" matching, cloud service allocations or the like.

As specifically shown in FIG. 2, the requirements 104 can be defined by time constraints 200, efficiency constraints 202, physical constraints 204 and/or technological constraints 206. For example, if a task must be performed within a certain timeframe and computing resources are required for completing a portion or all of the task, the time constrains 200 can be defined accordingly (e.g., complete a task within one day), which will in turn define the computing processor requirements needed to satisfy the defined time constraints 200. Similar determinations can be made for each of the efficiency constraints 202, physical constraints 204 and/or technological constraints 206. For example, if the requested task is editing of live video content, the required bit depth, luminance, color volume, and the like, can be determined based on the defined workflow. The required video characteristics can be specified in the technological constraints 204 of the requirements 104. Other criteria could be for example, a type as discussed earlier, and/or a particular cost associated with the resource. In this respect, the resource metadata used for equivalence can permit selection via elastic search in one aspect, rather than traditional optimization, of fuzzy algorithms.

Using the computing processor requirements as an example, the system can be configured to achieve equivalent results by routing differently the required processes. In other words, the system does not simply swap a CPU-based task to an FPGA-based task, but the system can be configured to dynamically swap one FPGA for ten CPUs running in parallel, for example, assuming the media can flow between these interconnected CPUs. That is, based on the results obtained by metadata collection module 112 for the capabilities of the available devices (e.g., resources 113-1 to 113-6), the equivalence processor 110 can build a workflow to execute the task(s) in parallel. For example, at the micro scale, the equivalence processor 110 can effectively remap each atomic task using equivalence and, at the macro scale, the system can remap whole subsystems and achieve very different attributes or properties of the process.

In some aspects, the concept of equivalence can be applied to video cameras (e.g., video camera 113-1) to provide a unified "look" across several different cameras, even including different makes and models of particular cameras. First, equivalence can be created across a group of the same camera, more expansively across a number of different cameras similarly manufactured and carefully characterized, and then, even different cameras from different vendors. In the example of a camera resource, a descriptive set of metadata may include certain camera settings and their values, by camera vendor, and the like.

The unique "look" (metadata set) that a client desires has a particular identity. The look criteria are compared to other camera types which are similarly described. If the match is "good enough" (as described above according to a fuzzy algorithm), a particular camera or cameras maybe deemed as good as the desired outcome, or look. In exemplary aspects, the "look" may be attributable to an expert user, and the settings could represent their expert knowledge. This information may also be stored in the metadata database 120, or in another form of storage such as cloud storage (S3). In other words, the metadata database 120 can be located in a data cloud environment, on premises of the device 102, or the like. Expert users provide the filter which may greatly reduce the time associated with search, optimization and training by the equivalence module 110. Machine learning and artificial intelligence are applied to the data sets in order to filter, process, and then gain the advantage for processing and training in order to accurately answer future requests.

In yet another aspect, the equivalence patterns can themselves be used as signatures for pattern recognition, statistical analysis and equivalence between a "look" and a factory to generate the look. Here, a factory refers to one or more resources that generate a particular outcome. In this aspect, these signatures can facilitate more efficient machine learning (ML) and therefore, artificial intelligence (AI). Because the equivalence table can be generated by an expert, they provide expert level training for AI. Because these signatures can be included in the feedback loop of the "factory" and by association, learning (state, velocity, quality are measured), they provide unsupervised learning capability.

Figure 4:
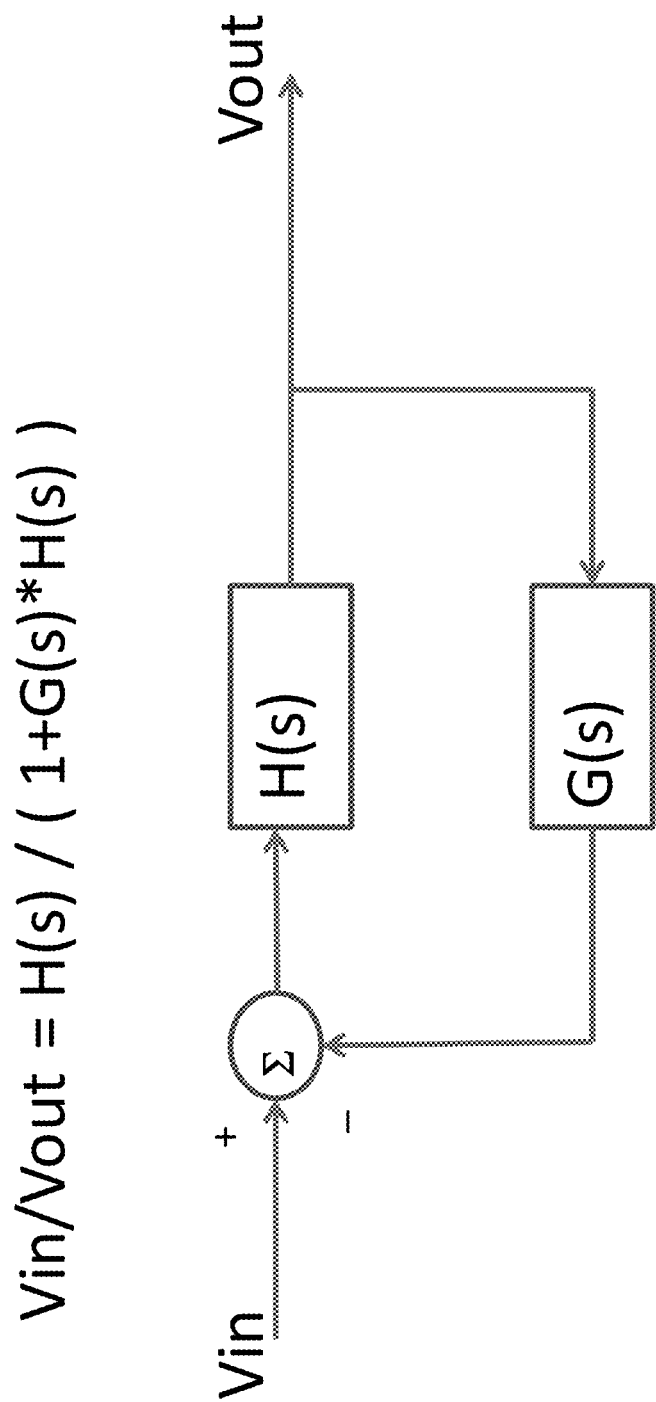
FIG. 4 is a diagram illustrating factory behavior, in accordance with exemplary aspects of the present disclosure.

FIG. 4 is a diagram illustrating factory behavior, in accordance with exemplary aspects of the present disclosure. More particularly, the diagram illustrates an example of an feedback loop. That is, in some instances, the control loop can represent a factory. H(s) may be a linear cascade of processes, or maybe a re-orderable set of processes. In exemplary aspects of the system 100, a group of processes (a type of resource) can be configured as the factory, or in other words, conforming to the Infrastructure as Code (IAC) paradigm. Subsequently, each process can be adjusted for the task at hand, conforming to the configuration as code (CAC) paradigm. If there exist equivalent h(s) units, they may be exchanged to create the overall H(s). G(s) is that control compensation designed to close the loop for stability. Or, in this case, the configuration, parameter settings and control functions required for optimal factory performance.

The factory has unique identity for its composition and process. Any code set, for example, including the IAC, CAC, DNS, metadata representation of equivalence, etc., all have identity. Therefore, any business model, such as those that sell by time period using, e.g., credits, sell by use, sell as capital expenditure, or the like, can be used simultaneously, and optimally for any business transaction which may be based on cloud location, or other forms of factory deployment, including transient factory elements. IAC and CAC provide customization of the target factory and suitability analysis of that target. So long as the factory provides an outcome that is deemed good enough according to a particular algorithm, it may be used, i.e. returned to the client 102 for use. All business transactions trace back fully to the manufacture and development of the item, or item set. Customer preference is now learned. This end user feedback is then applicable to ad and content placement, as user preference, in one example. It is important to know that a set's identity is equivalent to a traditional item model number in order to encourage auditability of factory output and the like.

In a refinement of this example, certain tasks or processes of the requested workflow (i.e., for performing the designated task) can be assigned to end user devices. For example, if the requested task is processing and construction of a media stream, and if consumers are viewing the output of the media factories on active devices (e.g., web browsers, phones, tablets), then the final assembly of the finished product (e.g., the video stream) can be delayed until the edge device, for example, on the media browser of the device. However, since the devices are not homogenous, some browsers may not be able to render complex media streams so an equivalent stream of pre-rendered material may be requested by the browser from the central resource. Advantageously, edge rendering enables tailored TV, with unique advertising based on the consumer that is watching.

Figure 3:
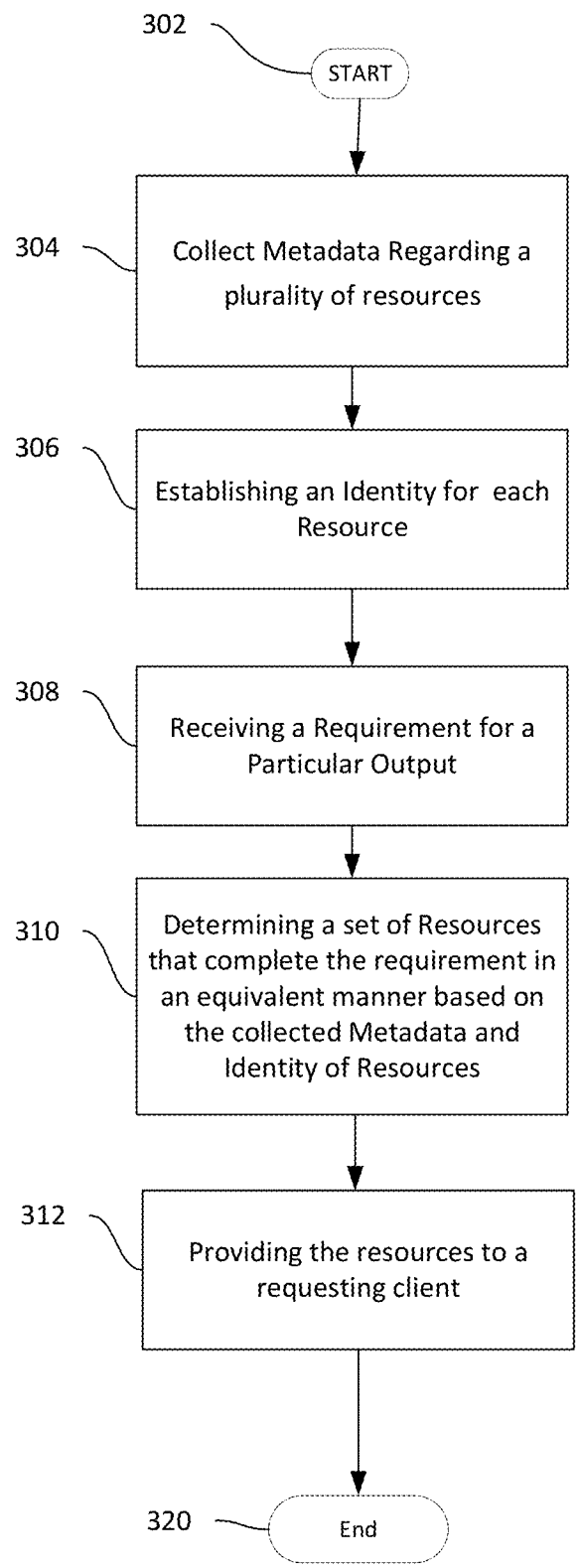
FIG. 3 is a flow diagram of a method of identifying equivalents for task completion, in accordance with exemplary aspects of the present disclosure.

FIG. 3 is a flow diagram of a method 300 of identifying equivalents for task completion, in accordance with exemplary aspects of the present disclosure. The method 300 begins at 302 and proceeds to 304. At 304, a metadata collection module collects metadata regarding the plurality of resources and storing the metadata as metadata information in the database. These resources, as described above, may be physical, or software based or the like. Each of the resources may either submit its own metadata information, may expose APIs for another service to collect the metadata resources, or may be inspectable to determine metadata information.

At 306, an identity module establishes an identity for each resource or set of resources, and/or even each request itself. The identity of a resource specifies, or links to the specification of, the capabilities, functionality and other identifying factors of the resource. Different resources have different identifies, but may be equivalent in their output.

At 308, a transmission module receives, from a client, a requirement for a particular output. The output may be, for example, a particularly desired goal, e.g., a camera "look", or a function that corrects color, or the like. The requirements indicate the constraints that the resource must meet in order to be considered for the client.

At 310, an equivalence module is configured to determine a set of resources that complete the requirement in an equivalent manner based on the collected metadata and identity of resources and provides the resources to the requesting client. The equivalence module may also provide information relating to capabilities of each of the resources, time of completion for each set of resources, efficiency, cost, power usage and many other data points in which particular resources differ when providing equivalent results. In other words, each resource or set of resource may accomplish the desired goal (or as close as possible to the desired goal), but may differ in duration, cost or efficiency.

Each of these pieces of information is made available to the client at step 312 in order for the client to select the required resources in building their system or achieving the desired goal. For example, in one exemplary aspect, the client device 102 is provided with a user interface that enables the client device to build the workflow for executing the task, where the workflow can dynamically select the requirements 104. Upon receiving the available list of resources at step 312, the user interface of the client device can provide a list of each resources for each process in the task to be completed. The user can then select the best resource for performing that process. For example, the user can be presented with a number of factors including cost, time and quality for each resource capable of performing each process. The user can then weigh each of these factors to select the "best" resource. Alternatively, the client device 102 can automatically and/or dynamically select the resource according to predefined criteria (e.g., minimize cost or maximize quality) for performing the task. As finally shown, the method terminates at 320, which can be, for example, the actual completion of the task using the selected resources.

In either case (i.e., user controlled or automatically controlled), it should be appreciated that each option will have costs and, as such, the application can be configured to minimize costs for a particular vector (e.g., time versus economic costs vs. content quality). Similarly, each option will also have benefits and the application can be configured to maximize benefits for a particular vector. A third option is both costs and benefits are modelled. Then the application can trade off cost minimization with benefit maximization. Finding these minima or maxima can be non-trivial and subject to a heuristic search, for example, such as a hill climb or a genetic algorithm. However, in all cases the user can choose the criteria that the search will optimize. For example, the operator can use the user interface to select, for example, "minimize economic costs". In such an instance, the system is then configured to dynamically select the one or more resources for performing the task that meet the minimum threshold from a quality cost while also minimize the overall economic costs to the operator. In other words, if two separate image capture devices each have the physical characteristics to obtain a sufficient quality image (e.g., 1080p versus 1080i), the system will be configured to automatically select the image capture device to complete the task that is lower from an economic perspective.

It should be appreciated that the system and method disclosed herein for identifying equivalents for task completion provides a flexible and dynamic system for accomplishing requested workflows and tasks. For example, a physical factory has hard edges, e.g., walls, a building and the like, and thus by definition is not elastic. As such, the deployed physical factory is optimized for achieving one task, but is therefore very inflexible to achieving other tasks. In contrast, the cloud, with its apparently infinite resources and its almost limitless interconnectedness, can be seen as having ultimate elasticity. Using the disclosed system and method, task performance no longer needs to be accomplished by predicting demand or consumption and design accordingly. Instead, the system predicts flexibility and available capabilities and reacts accordingly.

Figure 5:
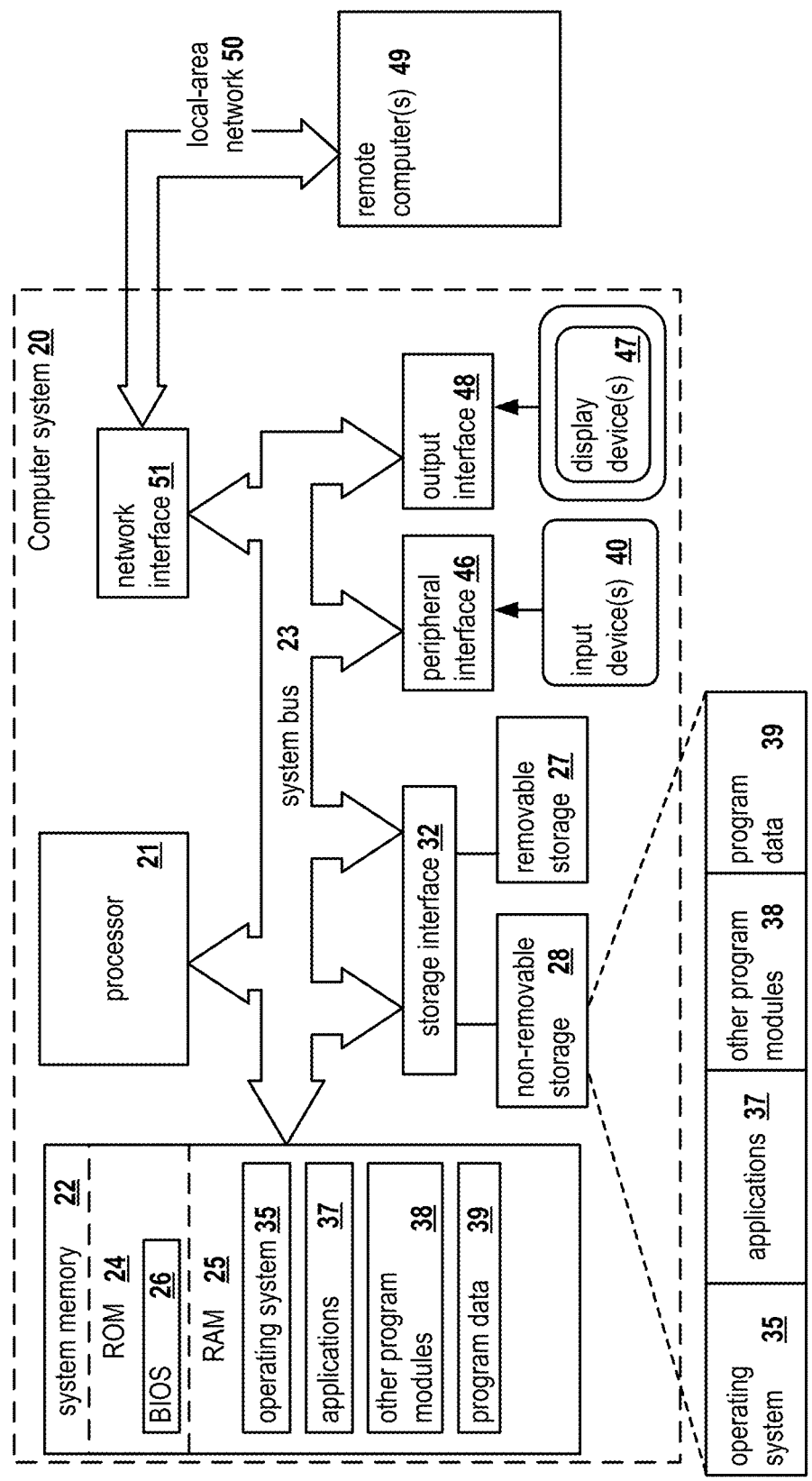
FIG. 5 is a block diagram illustrating a computer system on which aspects of systems and methods of identifying equivalents for task completion may be implemented in accordance with an exemplary aspect.

FIG. 5 is a block diagram illustrating a computer system 20 on which aspects of systems and methods of determining equivalence may be implemented in accordance with an exemplary aspect. It should be noted that the computer system 20 can correspond to the system 100 or any components therein. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for determining equivalence to execute a task, the system comprising: a metadata database comprising metadata information associated with a plurality of resources that include both physical resources and soft resources; and a processor configured to: obtain a unique identity for each of the plurality of resources; obtain a requirement constraint that a resource must satisfy to be considered for executing the task; collect metadata information relating to the plurality of resources based on the obtained unique identity for each of the plurality of resources, and to store the collected metadata information in the metadata database, wherein the metadata information relates to capabilities of each respective resource to satisfy the requirement constraint for executing the task and enumerates the respective capabilities and a respective capacity for each capability of the respective resource of the plurality of resources, wherein the respective capabilities include at least bandwidth and latency and the respective capacity is a range including the arithmetic precision or processing time; determine at least one set of resources of the plurality of resources that are configured to satisfy the requirement constraint for the task defined by a requesting client device in an equivalent manner based on the collected metadata information of the at least one set of resources; and provide access to the determined at least one set of resources to the requesting client device to coordinate execution of the task by at least a portion of the one set of resources to execute the task.

2. The system of claim 1, wherein the capabilities for performing processes of the task relate to required time, efficiency, physical capabilities and technological capabilities of the respective resource to perform the process.

3. The system of claim 1, wherein different subsets of the metadata information provide a measure of equivalence, and each subset is assigned a unique identity.

4. The system of claim 1, wherein the processor is further configured to determine the at least one set of resources for completing requirements of the task in the equivalent manner by selecting the at least one set of resources that comprises the capabilities for performing respective processes for executing the task when other resources of the plurality of resources with equivalent capabilities are not available for completing the task.

5. The system of claim 1, wherein the requesting client device is configured to provide a user interface that defines the task and the client device is configured to automatically build requirements for completing the task.

6. The system of claim 5, wherein the user interface provided by the client device is configured to display a list of the at least one set of resources, such that the user can select the portion of the at least one set of resources to coordinate the execution of the task.

7. The system of claim 1, wherein the processor is further configured to dynamically update the metadata information in the metadata database to indicate an availability and a capability of each resource of the plurality of resources as the respective availability and capability of the resource changes.

8. A system for determining equivalence to execute a task, the system comprising a processor configured to: obtain a unique identity for each of a plurality of resources; obtain a requirement constraint that a resource must satisfy to be considered for executing the task; collect metadata information relating to the plurality of resources based on the obtained unique identity for each resource of the plurality of resources, and to store the collected metadata information in a metadata database, wherein the metadata information relates to capabilities of the respective resource to satisfy the requirement constraint for executing the task and enumerates the respective capabilities and a respective capacity for each capability of the respective resource of the plurality of resources, wherein the respective capabilities include at least bandwidth and latency and the respective capacity is a range including the arithmetic precision or processing time; determine at least one set of resources of the plurality of resources that are configured to satisfy the requirement constraint for the task defined by a requesting client device in an equivalent manner based on the collected metadata information of the at least one set of resources; and provide access of the determined at least one set of resources to the requesting client device to coordinate execution of the task by at least a portion of the one set of resources to execute the task.

9. The system of claim 8, wherein the plurality of resources include both physical resources and soft resources.

10. The system of claim 8, wherein the capabilities for performing processes of the task relate to required time, efficiency, physical capabilities and technological capabilities of the respective resource to perform the respective process.

11. The system of claim 8, wherein different subsets of the metadata information provide a measure of equivalence, and each subset is assigned a unique identity.

12. The system of claim 8, wherein the processor is further configured to determine the at least one set of resources for completing requirements of the task in the equivalent manner by selecting the at least one set of resources that comprises the capabilities for performing respective processes for executing the task when other resources of the plurality of resources with equivalent capabilities are not available for completing the task.

13. The system of claim 8, wherein the requesting client device is configured to provide a user interface configured to define the task and the client device is configured to automatically build requirements for completing the task.

14. The system of claim 13, wherein the user interface provided by the client device is configured to display a list of the at least one set of resources, such that the user can select the portion of the at least one set of resources to coordinate the execution of the task.

15. The system of claim 8, wherein the processor is further configured to dynamically update the metadata information in the metadata database to indicate an availability and a capability of each resource of the plurality of resources as the respective availability and capability of the resource changes.

16. A method for determining equivalence to execute a task, the method comprising: storing, in a metadata database, metadata information associated with a plurality of resources that include both physical resources and soft resources; obtaining a unique identity for each of the plurality of resources; obtaining a requirement constraint that a resource must satisfy to be considered for executing the task; collecting metadata information relating to the plurality of resources based on the obtained unique identity for each of the plurality of resources, wherein the metadata information for the plurality of resources enumerate the respective capabilities and a respective capacity for each capability of the respective resource of the plurality of resources, wherein the respective capabilities include at least bandwidth and latency and the respective capacity is a range including the arithmetic precision or processing time; storing, in the metadata database, the collected metadata information, which relates to capabilities of each respective resource to satisfy the requirement constraint for executing the task; determining at least one set of resources of the plurality of resources that are configured to satisfy the requirement constraint for the task defined by a requesting client device in an equivalent manner based on the collected metadata information of the at least one set of resources; and providing access to the determined at least one set of resources to the requesting client device to coordinate execution of the task by at least a portion of the one set of resources to execute the task.

17. The method of claim 16, wherein the capabilities for performing processes of the task relate to required time, efficiency, physical capabilities and technological capabilities of the respective resource to perform the process.

18. The method of claim 16, and different subsets of the metadata information provide a measure of equivalence, and each subset is assigned a unique identity.

* * * * *